United States Patent
Acker et al.

(10) Patent No.: US 6,883,140 B1
(45) Date of Patent: Apr. 19, 2005

(54) SYSTEM AND METHOD FOR EDITING DIGITALLY REPRESENTED STILL IMAGES

(75) Inventors: Kristin D. Acker, Seattle, WA (US);
Xiaoli Yang, Bellevue, WA (US);
Sheldon R. Fisher, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/512,154

(22) Filed: Feb. 24, 2000

(51) Int. Cl.[7] ............................................. G09G 5/00
(52) U.S. Cl. .................... 715/730; 715/732; 715/722; 715/845
(58) Field of Search ......................... 715/720, 721, 715/722, 723, 724, 725, 845, 517, 523, 530; 382/296, 297, 298, 299, 274, 275, 254, 305; 345/716, 722, 730, 731, 732, 719, 720, 721, 723, 724, 838

(56) References Cited

U.S. PATENT DOCUMENTS

| | | | | |
|---|---|---|---|---|
| 6,031,529 A | * | 2/2000 | Migos et al. | 345/783 |
| 6,097,389 A | * | 8/2000 | Morris et al. | 345/804 |
| 6,237,010 B1 | * | 5/2001 | Hui et al. | 345/428 |
| 6,282,330 B1 | * | 8/2001 | Yokota et al. | 382/309 |
| 6,333,752 B1 | * | 12/2001 | Hasegawa et al. | 345/581 |
| 6,389,159 B1 | * | 5/2002 | Gilman et al. | 382/162 |
| 6,437,811 B1 | * | 8/2002 | Battles et al. | 345/835 |

* cited by examiner

*Primary Examiner*—Ba Huynh
(74) *Attorney, Agent, or Firm*—Shook, Hardy & Bacon L.L.P.

(57) ABSTRACT

A method of selecting and editing a plurality of digitally represented still images in a computer environment is provided. The method includes the use of a graphical user interface having a display and a user interface selection device, and includes the steps of opening the data files of the images to be edited, displaying the images, and displaying a task pane including at least one editing task entry having a specified multiple-image editing task command. A group of all or some of the images is formed by the user selecting the images to be edited, and an editing task execution signal is received which is indicative of the user selecting the desired editing task entry on the task pane. In response to receipt of the editing task execution signal, the specified editing task command is performed on the group of selected still images.

8 Claims, 14 Drawing Sheets

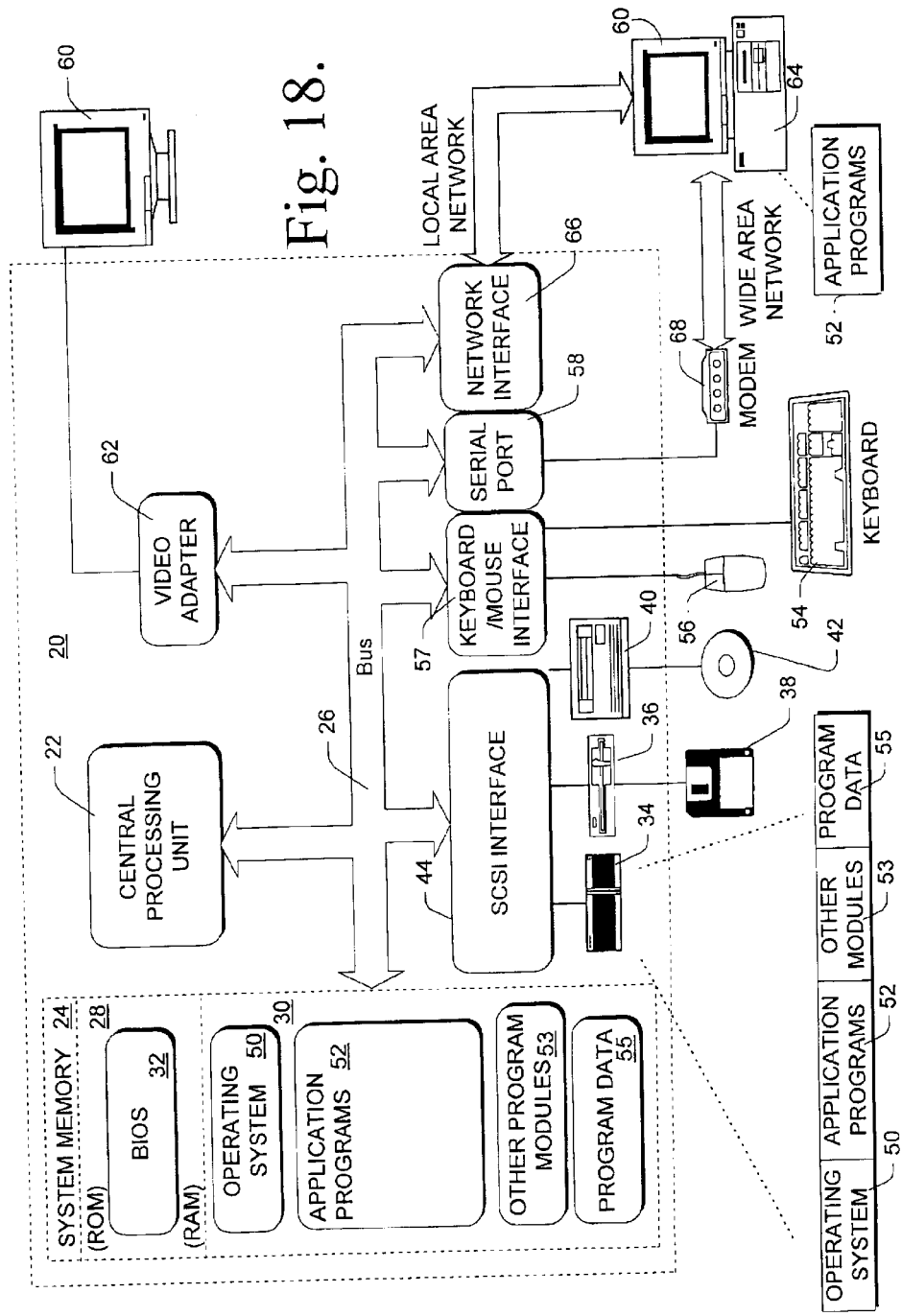

SYSTEM AND METHOD FOR EDITING DIGITALLY REPRESENTED STILL IMAGES

TECHNICAL FIELD

The present invention relates generally to editing digitally represented still images and, more particularly, to a system and method for performing one or more editing tasks on a group of still images without requiring the images to be selected and edited individually.

BACKGROUND OF THE INVENTION

Digitally represented still images are commonly used in the computer environment as graphics for applications software and games and as digitally stored photographs that can be easily manipulated, printed and transmitted for commercial and entertainment purposes. Software packages are available for use in handling the data files in which such still images are stored. Such software packages include numerous editing capabilities including archiving the images, printing the images in various sizes and formats, and sending or uploading the images to other computers or users via the Internet or fax. Known photo editing software packages also include numerous other editing capabilities, including the ability to rotate an image, crop it, and correct its brightness, contrast, and tint. In addition, such software packages typically include the ability to cut portions out of one image and incorporate them into a collage, and to perform many other special effects.

In order to manipulate a still image digitally, a digital representation of the image is created, either by taking a digital photograph with a conventional digital camera, or by scanning an existing printed image or its film negative to generate a digital facsimile of the original. Once a digital representation of the image exists, it can be retrieved into the system memory of a computer and edited through the use of the photo editing software.

Conventionally, once a user has taken a group of photographs with a digital camera, he or she downloads the images to a computer either by connecting the camera directly to the computer through a serial port connection, or by transferring a flash memory card from the camera to a flash memory adapter of the computer, wherein the flash memory card contains the data files of the images. Alternately, a user will take pictures with a conventional film camera and obtain a copy of the pictures in digital format on a compact disc ("CD") that can be read by a conventional CD drive on the user's computer.

Once the data files of the images are downloaded, they are opened in the photo editing software, and may be individually saved, manipulated, printed or sent to other users. However, because conventional photo editing software does not allow editing of the images as a group, a user must repeat any desired editing steps with each image in turn. This represents a drawback in the use of conventional photo editing software.

For example, if several of the images require rotation, the user must select each image individually within the photo editing software and rotate that image before selecting a different one of the images for rotation. As a result, the user must repeat the steps required to rotate the images several times until all of the images have been individually selected and edited. This process is slow and requires numerous repetitive user operations, impeding the ability of the user to quickly edit the group of images once they are downloaded.

Another example illustrative of the drawback arises when a user employs a scanner that produces a group of digitally represented still images that are all darker than desired. When a group of these images is opened in the photo editing software, the user must select each image and correct the brightness and contrast of the image before selecting a different one of the images and repeating the same editing operation. Often, the degree of brightness and contrast correction required is the same for all of the images in the group, and the steps employed to correct each image are identical to those employed with the other images. In addition, some of the images will also likely require rotation or some other type of editing, and these steps must be carried out separately for each image.

SUMMARY OF THE INVENTION

In accordance with the present invention, a system and method are provided for enabling a computer user to quickly and efficiently perform any of several different editing tasks on a group of pictures that have been downloaded or retrieved by the user. The present invention employs a system having a graphical user interface, a display, a keyboard, and a pointing device, and includes a method employing the acts of opening the data files of the images to be edited, displaying the images, and displaying a task pane including several different editing sub-task entries for carrying out specified editing sub-tasks. A group of all or some of the images is formed by the user selecting the images to be edited, and one of the editing sub-tasks is performed based on a selection by the user of the desired editing sub-task entry on the task pane.

By providing a system in accordance with the present invention, numerous advantages are realized. For example, by permitting a user to select a group of open still images for multiple-image or batch editing, it is possible to significantly reduce the number of user steps and time required to perform the editing operations on the selected images. As such, a user can quickly download and edit a group of still images from a digital camera or other source, obviating the need for time-consuming post-download manipulation and saving of each individual image.

BRIEF DESCRIPTION OF THE SEVERAL VIEWS OF THE DRAWING

The present invention is described in detail below with reference to the attached drawing, wherein:

FIG. 18 is a schematic view of an exemplary operating environment in which the invention can be practiced.

DETAILED DESCRIPTION OF THE INVENTION

Figure 1:
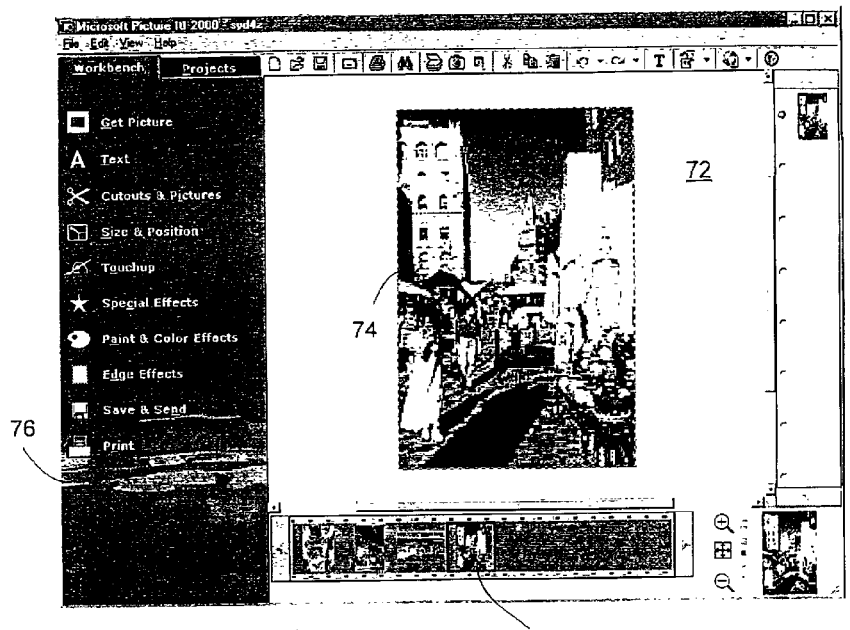
FIG. 1 is a view of a display produced by the software package Microsoft "PICTURE IT!®", with the system and method of the present invention implemented.

An exemplary computing environment in which the invention may be implemented is illustrated schematically in FIG. 18. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including digital cameras and other hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 18, an exemplary system for implementing the invention includes a general purpose computing device in the form of a conventional personal computer 20, including a processing unit 22, a system memory 24, and a system bus 26 that couples various system components including the system memory to the processing unit 22. The system bus 26 may be any of several types of bus structures including a memory bus or memory controller, a peripheral bus, and a local bus using any of a variety of bus architectures. The system memory 24 includes read only memory (ROM) 28 and random access memory (RAM) 30. A basic input/output system (BIOS) 32, containing the basic routines that helps to transfer information between elements within the personal computer 20, such as during start-up, is stored in the ROM 28 of system memory 24. The personal computer 20 further includes a hard disk drive 34 for reading from and writing to a hard disk, a magnetic disk drive 36 for reading from or writing to a removable magnetic disk 38, and an optical disk drive 40 for reading from or writing to a removable optical disk 42 such as a CD ROM or other optical media. The hard disk drive 28, magnetic disk drive 30, and optical disk drive 34 are connected to the system bus 26 by a small computer system interface (SCSI) 44. The drives and their associated computer-readable media provide non-volatile storage of computer readable instruction, data structures, program modules and other data for the personal computer 20. Although the exemplary environment described herein employs a hard disk, a removable magnetic disk and a removable optical disk, other types of computer readable media which can store data that is accessible by a computer, such as magnetic cassettes, flash memory cards, digital video disks, Bernoulli cartridges, random access memories (RAMs), read only memories (ROMs), and the like, may also be used in the exemplary operating environment.

A number of program modules may be stored on the hard disk, magnetic disk, optical disk, ROM or RAM, including an operating system 50, one or more application programs 52, other program modules 53, and program data 55. A user may enter commands and information into the personal computer 20 through input devices such as a keyboard 54 and pointing device 56, both of which are commonly connected to the processing unit 22 through a keyboard/mouse interface 57 that is coupled to the system bus 26. Other input devices may include a microphone, joystick, game pad, satellite dish, scanner, or the like. These and other input devices are often connected to the processing unit 22 through a serial port interface 58 that is coupled to the system bus, but may be connected by other interfaces, such as a parallel port, game port or a universal serial bus (USB). A monitor 60 or other type of display device is also connected to the system bus 26 via an interface, such as a video adapter 62. In addition to the monitor, personal computers typically include other peripheral output devices such as speakers and printers.

The personal computer 20 may operate in a networked environment using logical connections to one or more remote computers, such as a remote computer 64. The remote computer may be another personal computer, a server, a router, a network PC, a peer device or other common network node, and typically includes many or all of the elements described above relative to the personal computer 20. The logical connections include a local area network (LAN) and a wide area network (WAN). Such networking environments are commonplace in offices, enterprise-wide computer networks, intranets and the Internet.

When used in a LAN networking environment, the personal computer 20 is connected to the local network through a network interface or adapter 66. When used in a WAN networking environment, the personal computer 20 typically includes a modem 68 or other means for establishing communications over the wide area network, such as the Internet. The modem 68, which may be internal or external, is connected to the system bus 26 via the serial port interface 58. In a networked environment, program modules depicted relative to the personal computer 20, or portions thereof, may be stored in the remote memory storage device. It will be appreciated that the network connections shown are exemplary and other means of establishing a communication link between the computers may be used.

The system and method of the present invention allow a user to quickly and efficiently perform any of several different editing tasks on a group of pictures that have been downloaded or retrieved by the user. Although the system and method are described as being implemented in an exemplary embodiment with the PICTURE IT!® software package by Microsoft, one skilled in the art would recognize that the system and method can be implemented with other photo editing software or independently of such software.

FIG. 1 is a view of a display produced by the software PICTURE IT!®, with the system and method of the present invention implemented. A user of the PICTURE IT!® application typically opens the application to download or otherwise open still images for editing. The user interface provided by the application is presented in an application window and includes a filmstrip pane 70 in which thumbnails of all of the open images are displayed, a picture pane or image browser 72 within which a currently selected open image 74 from the filmstrip pane is displayed, and a menu 76 including a set of menu entries. A plurality of buttons are also displayed in a button bar extending across the top of the picture pane 72. The steps employed by the application for downloading and opening still images for use by the application are conventional and do not form a part of the invention.

Figure 2:
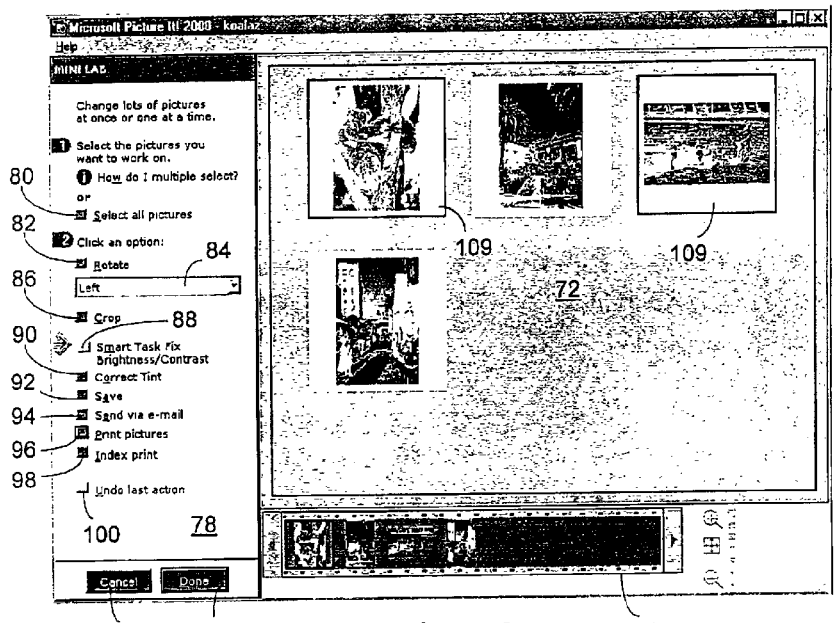
FIG. 2 is a view of a display produced during implementation of a system for editing digitally represented still images in accordance with the invention.

Once a group of still images has been downloaded in the conventional manner, the user indicates that the downloading step is complete by selecting a suitable menu entry displayed by the application during the download operation. Selection of the menu entry provides an execution command that automatically displays a main task pane 78 of an exemplary editing system constructed in accordance with the present invention, as shown in FIG. 2, along with the picture pane 72 and the filmstrip pane 70. In addition, the open still images currently displayed in the filmstrip pane 70 are displayed in the picture pane 72. Other panes may also be displayed with the main task pane, if desired.

In addition to providing automatic execution of the editing system of the present invention once the download of plural images is complete, a button entry or menu entry may also be provided in the PICTURE IT!® software application that initiates the system of the invention any time two or more images are open in the filmstrip. Alternately, a message box can be generated and displayed when two or more images are open, providing the user an option to initiate the system.

The main task pane 78 generally includes several selectable entries having executable commands for performing various steps. For example, but not by way of limitation, the main task pane includes a "Select All" entry 80 having an execution command for selecting all of the images open in the application for editing as a group, a "Rotate" entry 82 having an execution command for rotating the data files of any open still images selected by the user, a drop-down-list box 84 associated with the "Rotate" entry, a "Crop" entry 86 having an execution command displaying a sub-task pane that permits the user to crop any open still images selected by the user, a "Fix Brightness/Contrast" entry 88 having an execution command for carrying out an automated analysis and adjustment of the brightness and contrast of any open still images selected by the user, a "Correct Tint" entry 90 having an execution command for displaying a sub-task pane that permits the user to manipulate the tint of any open still images selected by the user, a "Save" entry 92 having an execution command for displaying a sub-task pane that permits the user to save any open still images selected by the user, a "Send" entry 94 having an execution command for displaying a sub-task pane that permits the user to send via e-mail any open still images selected by the user, and a "Print" entry 96 having an execution command for displaying a sub-task pane that permits the user to print any open still images selected by the user.

In addition, an "Index Print" entry 98 can be provided that includes an execution command for printing an index of any open still images selected by the user. An "Undo" entry 100 is also provided on the main task pane, and includes an execution command for undoing a preceding rotation, crop or brightness/contrast correction operation. A "Cancel" entry 102 displayed at the bottom of the main pane has an execution command for canceling all of the editing operations carried out by the system on the open still images currently selected by the user, exiting the system, and returning to the PICTURE IT!® application window shown in FIG. 1. A "Done" entry 104 is also provided on the main pane, and has an execution command for saving the editing operations carried out by the system on the currently open still images, exiting the system, and returning to the display of FIG. 1.

Figure 3:
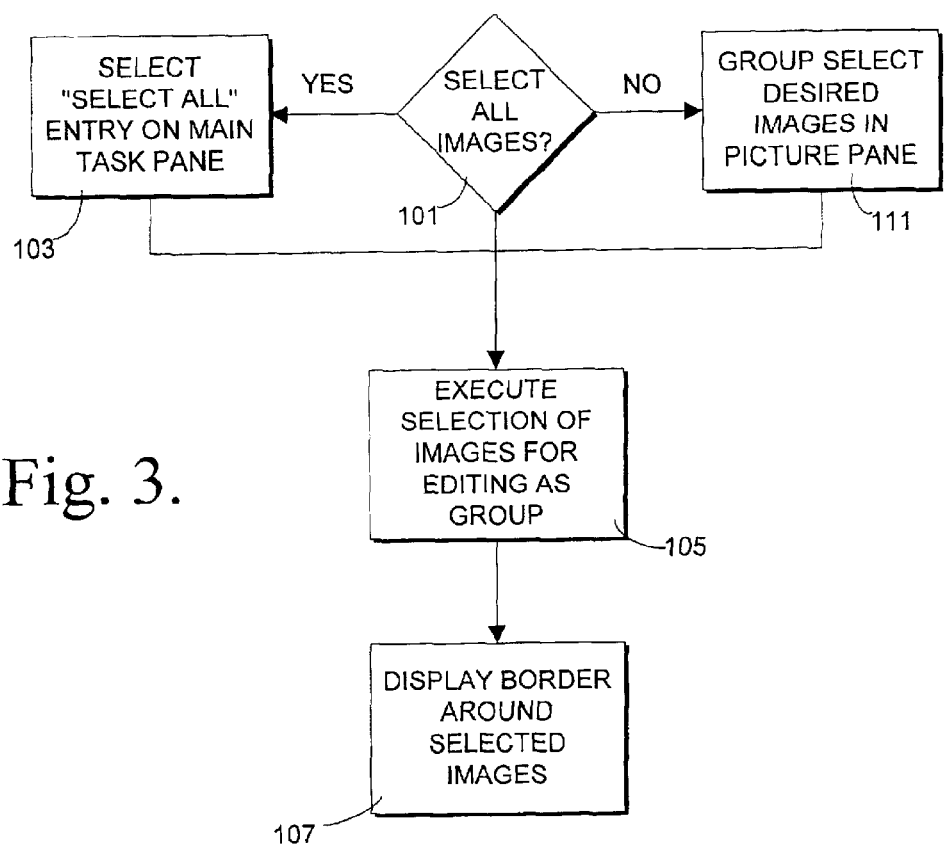
FIG. 3 is a flowchart illustrating the steps employed to select multiple images for editing as a group.

With continued reference to FIG. 2, in order to edit all of the images that are open in the application and displayed in the filmstrip and picture panes 70, 72, a user selects the "Select All" entry 80 of the main task pane 78, typically by moving the pointing device over the entry and clicking a button on the device or otherwise indicating the selection. As shown in FIG. 3, if the user is at step 101 and wants to select all of the images for editing, this selection is made at 103 so that a subsequent selection of one of the editing entries on the main task pane 78 is carried out on all of the open images. When the selection at 103 is executed at 105, a border is displayed at 107 around the selected images to indicate their selection. However, any other type of indication could be used.

If fewer than all of the images are to be edited, an alternate method is employed to select the images to be grouped. For example, if only the first and third images open in the picture pane require rotation, it is desired to select only these two images for editing as a group. This selection is made at 111 by depressing a control key on the keyboard, e.g. the "CTRL" or "SHFT" key, while at the same time moving the pointing device over each of the first and third images and clicking a button on the device or otherwise indicating each selection. Alternately, if the images to be grouped are located adjacent one another in the picture pane, the user can select them for editing as a group by dragging a selection box around the images using the pointing device.

When the selection at 111 is executed at 105, a border is displayed at 107 around the selected images. An exemplary border 109 is illustrated in FIG. 2, and includes a bold line extending around the first and third images of the top row of the picture pane, indicating that those two images have been selected for editing as a group.

Returning to FIG. 2, once the user has selected a group of images to be edited, he or she selects the entry on the main task pane corresponding to the desired editing task to be performed on the group of selected images. Some of the editing tasks employed in a preferred embodiment of the present invention are executed automatically upon selection of the corresponding entry, while other tasks are executed by displaying various sub-task panes presenting entries having additional execution commands for customizing the editing task for the group or individual images therein. However, in all cases, the selected editing task is performed on all of the images of the group without the requirement that each image be individually selected, edited, and saved before the next image to be edited can be selected.

In order to describe the steps employed by the system to carry out an editing operation on a group of selected images, the particular editing operations illustrated in the exemplary main task pane of FIG. 2 will be described. However, it is noted that the particular editing operations available to the user is not so limited. Any desired editing operation could be incorporated into the inventive system in order to permit the operation to be carried out on a group of images rather than on individual images.

Figure 4:
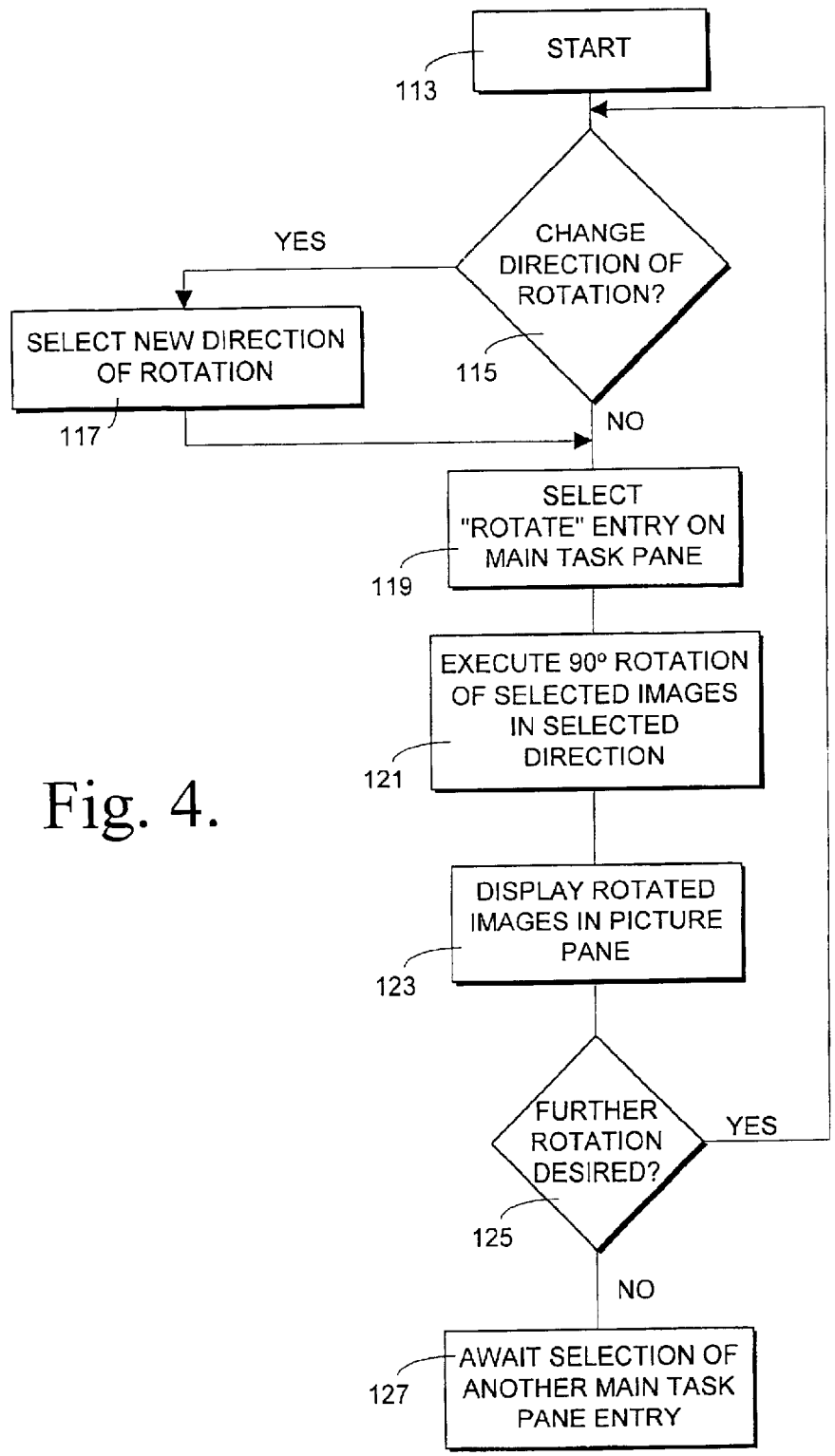
FIG. 4 is a flowchart illustrating the steps employed to rotate the group of images.

If a user selects the "Rotate" entry 82 after a group of open images displayed in the picture pane 72 have been selected, a rotation operation is executed on the selected images, as shown in FIG. 4, and the rotated images are displayed in place of the original images in both the picture pane and the filmstrip pane. As shown in FIG. 2, the drop down list box 84 is provided next to the "Rotate" entry 82 on the main task pane 78, and includes an execution command for changing the direction of rotation carried out during the editing operation, if desired. For example, starting at step 113, if the user allows the "Left" entry in the drop down list box to remain unchanged at 115 and selects the "Rotate" entry at 119, the images in the group will be rotated 90° at 121 in the counterclockwise direction, and the rotated images will be displayed in the picture pane at 123. If the user desires to rotate the image further, the "Rotate" entry is again selected at 119 to repeat the 90° rotation. If, at step 115, the user wants to change the direction of rotation to be carried out, he or she selects "Right" in the box 84 of FIG. 2, illustrated at step 117 in FIG. 4, and the images will be rotated in the clockwise direction each time the "Rotate" entry is selected. Once all desired rotations of the selected images have been completed, the user awaits the selection of another editing entry at 127.

The fix brightness/contrast editing operation is similar to the rotate operation in that both are performed on all of the selected images without any further action required of the user subsequent to selection of the entries on the main task pane. The correction made to each of the images when the entry 88 is selected is carried out automatically by the system in accordance with a conventional brightness/contrast correction algorithm that is incorporated in the system. Alternately, it would be possible to provide an algorithm that employs user-defined parameters, or to permit a user to make the correction manually.

Figure 5:
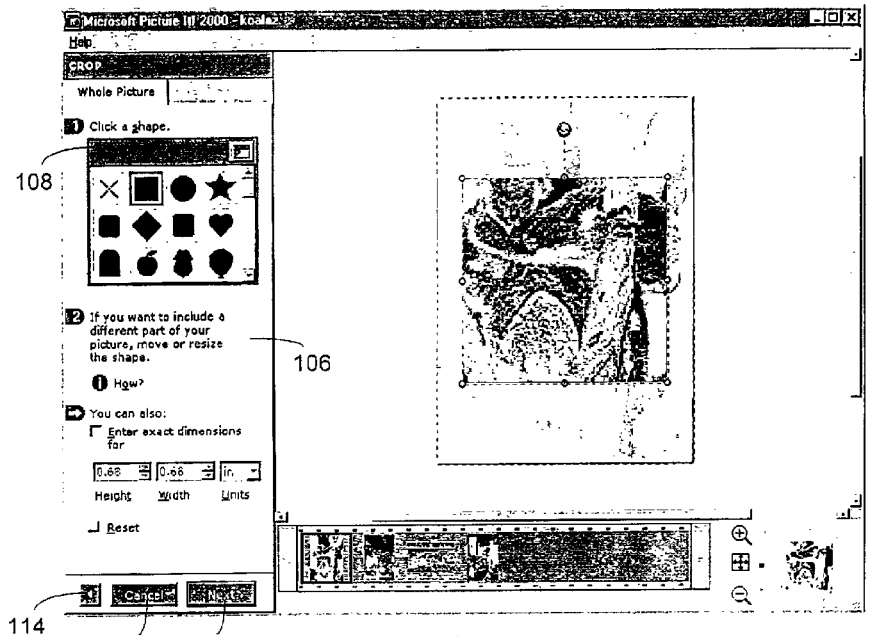
FIG. 5 is a view of a crop sub-task pane displayed during use of the system.

If a user selects the "Crop" entry 86 on the main task pane after a group of open images displayed in the picture pane have been selected, the crop operation is executed on the selected images. Preferably, the operation includes hiding all of the selected images in the group except the first, taken in the order the images are displayed on the filmstrip, and displaying a sub-task pane 106, shown in FIG. 5, in place of the main task pane. By hiding all but one of the pictures for cropping or other editing operations, the size of the single displayed picture can be enlarged relative to the thumbnails of the open images, facilitating editing of each selected image. In addition, a one-by-one presentation of the selected images simplifies editing of the images where step-by-step interaction is required for each image in order to complete the desired editing operation. However, a two-by-two presentation or any other implementation can be employed, including one in which the thumbnails of all of the selected images remain displayed during editing.

The sub-task pane 106 includes one or more option entries 108 having editing sub-task commands, a "Cancel" entry 110 having an execution command for canceling the cropping task without saving any crops made to images in the selected group, a "Next" entry 112 having an execution command for displaying the next selected image in the group in the picture pane for cropping, and a "◁" entry 114 for displaying the previous selected image in the group in the picture pane.

Figure 6A:
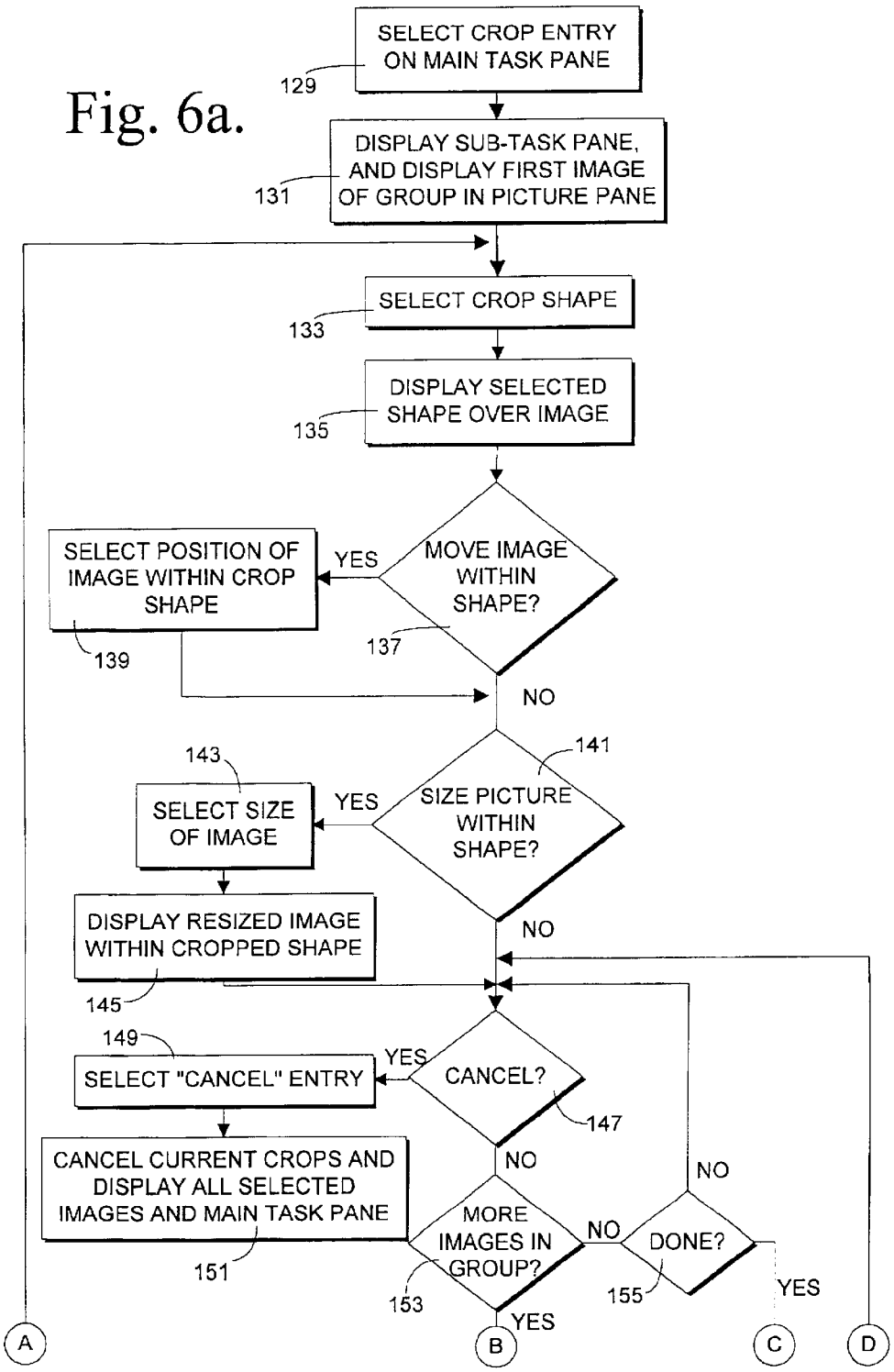
FIGS. 6a and 6b together provide a flowchart illustrating the steps employed to crop the group of images.

The illustrated option entry 108 is a table list box including a number of possible crop shapes that can be selected by the user for use on the displayed selected image. As shown in FIG. 6a, once the user has selected the "Crop" entry at 129, the sub-task pane is displayed at 131, and all of the selected images are hidden except the first one of the shapes which is enlarged and displayed alone. Thereafter, the user at 133 selects a crop shape from the table, and the selected shape is superimposed over the image at 135 so that the user can move and/or resize the image within the shape. If the user wants to reposition the image at 137, he or she selects the desired position of the image at 139, e.g. by positioning the pointing device over the image, depressing a button on the device, and then dragging the image to the desired position. If the user wants to resize the image at 141, the desired size is selected at 143, and the image is resized and displayed within the crop shape at 145.

Figure 6B:
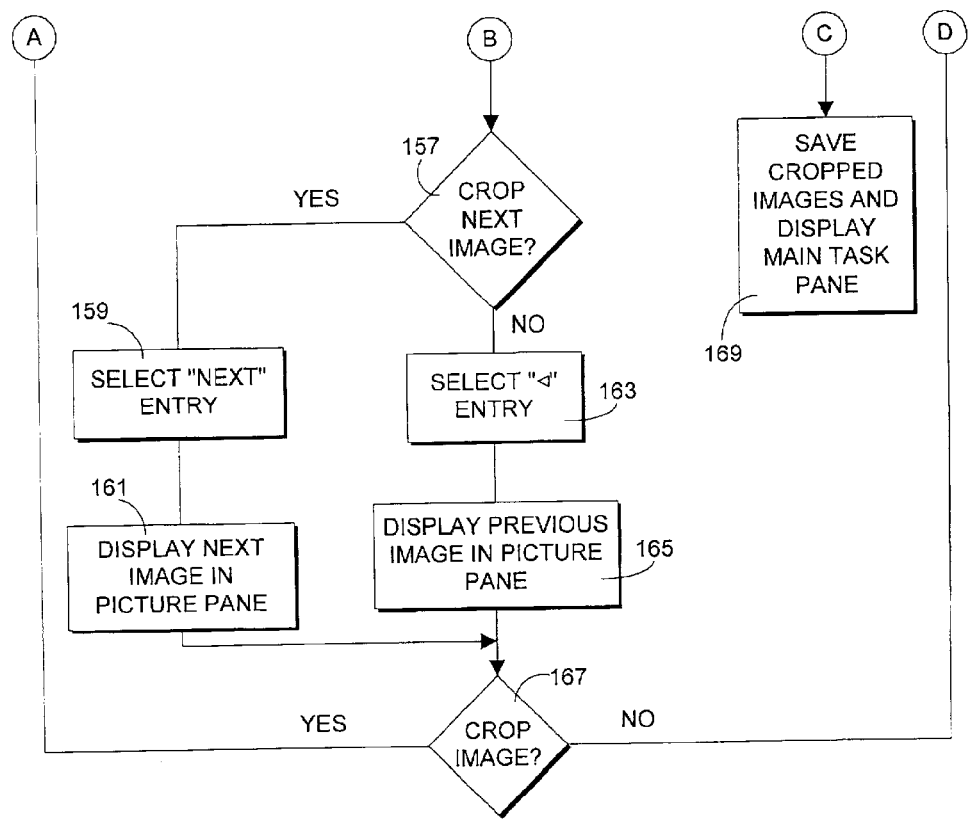

If after manipulating the image the user wants to cancel the cropping operation, at step 147, the "Cancel" entry on the sub-task pane is selected at 149, and the operation is canceled, returning the user to the main task pane, and displaying all of the selected images at 151. However, as shown in FIG. 6b, if the user wants to save the cropped image and move to another of the selected images at 157, then the "Next" entry on the sub-task pane is selected at 159, and the next image in the group is displayed at 161 in place of the first image so that the cropping operation can be repeated, beginning at step 133. When this is done, the crop shape previously selected is preferably displayed on top of the next displayed image. However, the shape can be changed by selecting a different shape in the sub-task pane. Alternately, if at step 157 the user wants to return to the previous image of the group, then he or she selects the "◁" entry on the sub-task pane at 163 and the previous image is displayed at 165 for cropping. Repeated selection of the "◁" or "Next" entries on the pane will sequentially display the selected images in the group, and any images that have been cropped will be displayed in the edited form. In each instance, the user at 167 is able to decide whether to crop the image and either continue or cancel the operation. Alternately, the user can simply skip the crop operation for the displayed image by selecting a no-crop option in the entry 108.

If at step 153 all of the images have been individually displayed for cropping, the user must decide if they are done with the crop sub-task at step 155. If desired, the user can cancel the cropping operation at 147. Otherwise, the program presents a "Done" entry in place of the "Next" entry, and the user indicates completion of the operation by selecting the entry at 169 so that the editing steps performed are saved, and the user is returned to the main task pane. If further crops are to be performed on one or more of the selected images, the user can simply back through the images until an image to be cropped is displayed.

Figure 7:
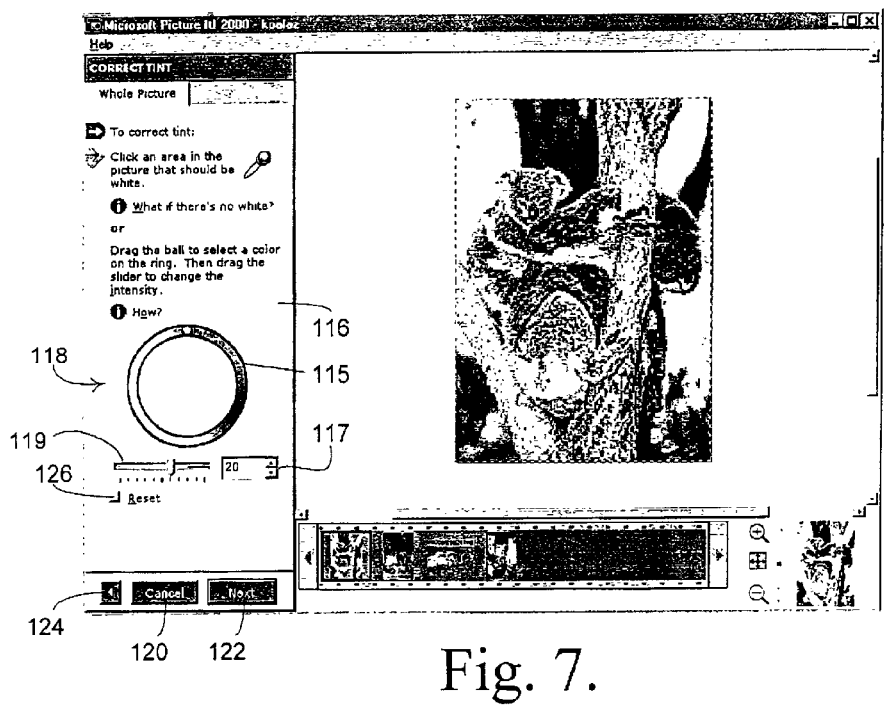
FIG. 7 is a view of a tint correction su-task pane displayed during use of the system.

The tint correction operation is preferably implemented in a manner similar to the crop operation. Thus, with reference to FIG. 2, if a user selects the "Correct Tint" entry 90 on the main task pane 78 after a group of open images displayed in the picture pane have been selected, the tint correction operation is executed on the selected images. The operation includes hiding all of the selected images in the group except the first, taken in the order the images are displayed on the filmstrip, and displaying a sub-task pane in place of the main task pane. The sub-task pane 116 is shown in FIG. 7, and includes one or more option entries 118, a "Cancel" entry 120 having an execution command for canceling the cropping task without saving any crops made to images in the currently selected group, a "Next" entry 122 having an execution command for displaying the next selected image in the group in the picture pane for cropping, and a "◁" entry 124 for displaying the previous image in the group.

In an exemplary implementation of the system, the user is given an option to either select an area of the displayed image that is supposed to be white by moving the pointing device over the entry and clicking a button on the device, or otherwise indicating the selection. This selection executes an automatic tint correction operation on the displayed image based on a conventional algorithm, leaving nothing further for the user to customize. Alternately, the entry 118 can be selected which permits the user to alter the tint of the displayed selected image to achieve any desired effect. The entry 118 includes a color ring 115 around which the color spectrum is displayed, a slide bar 117, and a range list box 119 that permit the tint of the displayed image to be altered. In addition, a "Reset" entry 126 is displayed on the tint sub-task pane 116, and has an execution command for undoing the current tint correction applied by the selection of entry 118 so that another attempt can be initiated by the user.

Once the user is satisfied with the tint correction performed on the image displayed in the picture pane, he or she indicates that the tint correction operation is complete by selecting one of the entries 122, 124 to display another of the images in the picture pane in much the same way as is done in connection with the cropping operation. Once all of the images have been displayed in the picture pane for tint correction, a "Done" entry is displayed on the sub-task pane 116 for executing a save of the changes to the images and returning to the main task pane.

In accordance with an alternate implementation of the system, the tint correction is automated in a manner similar to the brightness/contrast correction such that the user would simply select the "Correct Tint" entry 90 on the main task pane 78 after a group of open images displayed in the picture pane had been selected. Thereafter, the tint of the selected images would be corrected automatically in accordance with a conventional algorithm provided in the implementation of the system. As such, no user interaction would be required, and the images could be corrected while displayed collectively as thumbnails.

Figure 8:
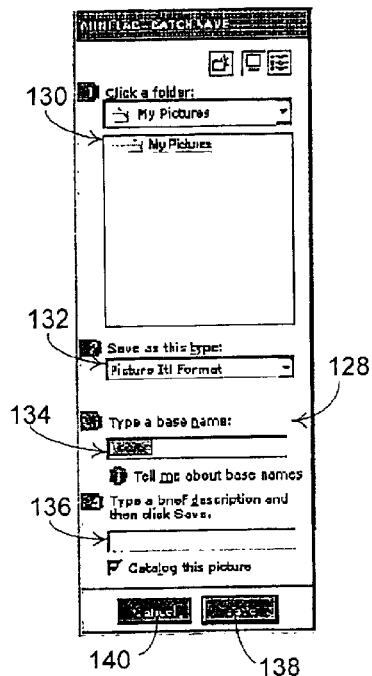
FIG. 8 is a view of a batch save sub-task pane displayed during use of the system.

Returning again to FIG. 2, if the user selects the "Save" entry 92 on the main pane 78 after a group of open images displayed in the picture pane have been selected, the save operation is executed on the selected images. The operation includes displaying a batch save sub-task pane 128, shown in FIG. 8, in place of the main task pane while all of the selected images remain displayed in the picture pane and filmstrip pane. The save sub-task pane 128 includes a file directory 130 for permitting the user to input the location where the group of images is to be saved, a format entry 132 for allowing the user to save the group of images in one of a number of different conventional formats, a name entry 134 in which a base name can be attributed to the selected images of the group, and a description entry 136 in which a description of the group of images can be entered. In addition, "Save" and "Cancel" entries 138, 140 are provided, wherein the "Save" entry 138 includes an execution command for saving the group of images in the selected location in the selected format, and the "Cancel" entry 140 has an execution command for canceling the currently selected save options and returning to the main task pane.

Figure 9:
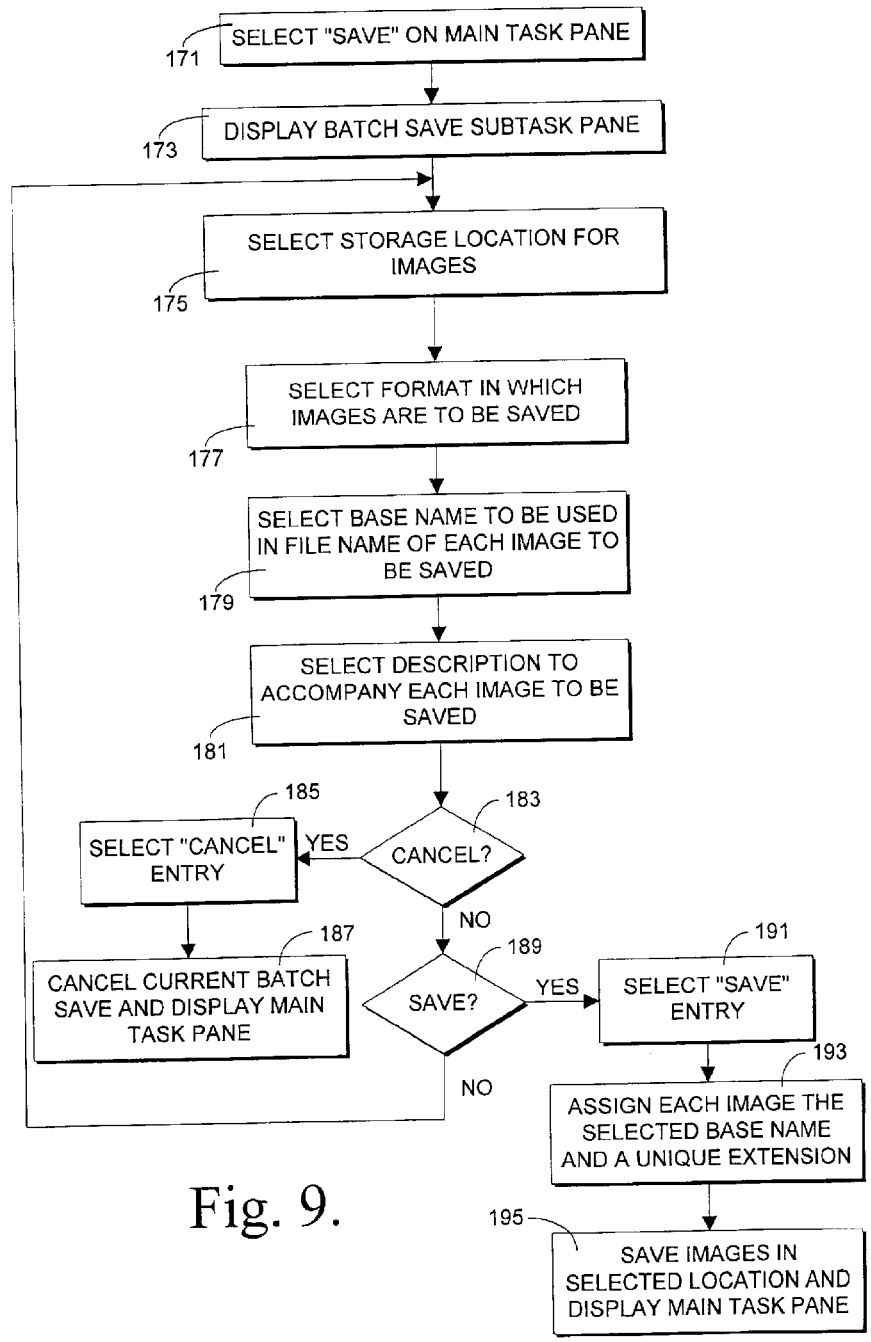
FIG. 9 is a flowchart illustrating the steps employed to save the group of images.

As shown in FIG. 9, when the "Save" entry on the save sub-task pane is selected at 171, the batch save sub-task pane is displayed at 173. The user then selects the storage location at 175, the base name at 179 and any desired description at 181 by entering or otherwise selecting the information in the entries 130, 132, 134, and 136 of the sub-task pane shown in FIG. 8. In addition, the user can select the size in which the images are to be saved, if desired. If, during entry of the noted selections, the user wants to cancel the save operation, at 183, the "Cancel" entry can be selected at 185. The operation is thereafter canceled at 187, returning the user to the main task pane.

If cancellation is not desired at 183, then the user must decide at 189 whether to save the images in the manner selected. If so, the user selects the "Save" entry on the sub-task pane at 191, and the images are saved in the desired location and in the desired format at 195 after being assigned the selected base name at 193. If not, the user is returned to step 175.

Preferably, a numerical extension is added to the base name of each image at 193, distinguishing the image from the others selected. The extensions are preferably assigned in =numerical order corresponding to the order of the images as displayed in the filmstrip pane 70. However, any other convention could be adopted. Alternately, the images could be saved to each file's original name, if desired. Once the save operation is completed by the system at 195, the user is returned to the main task pane 78.

Figure 10:
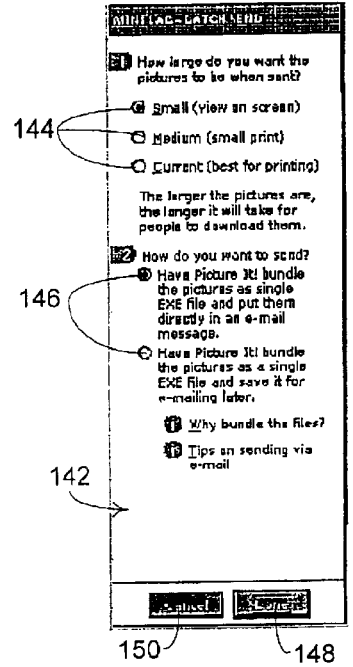
FIG. 10 is a view of a batch send sub-task pane displayed during use of the system.

With reference to FIG. 2, if the user selects the "Send" entry 94 of the main task pane 78 after a group of open images displayed in the picture pane have been selected, the batch send operation is executed on the selected images. The operation includes displaying a batch send sub-task pane 142, shown in FIG. 10, in place of the main task pane while all of the selected images remain displayed in the picture pane. The batch send sub-task pane 142 includes a first collection of radio buttons 144 having an execution command for setting the size of the data files associated with the selected images, and a second set of radio buttons 146 having an execution command for bundling the selected images into a single executable file for immediate attachment to an e-mail to be sent, or for saving so that the file can be attached to an email later. "Done" and "Cancel" entries 148, 150 are also provided on the batch send sub-task pane 142.

One advantage of providing bundling of the selected images includes the limitation imposed by some Internet service providers that an e-mail include no more than a single attachment. By bundling the group of images in a single executable file, the entire group of images can be attached to a single e-mail, simplifying the process of sending images via e-mail.

Figure 11:
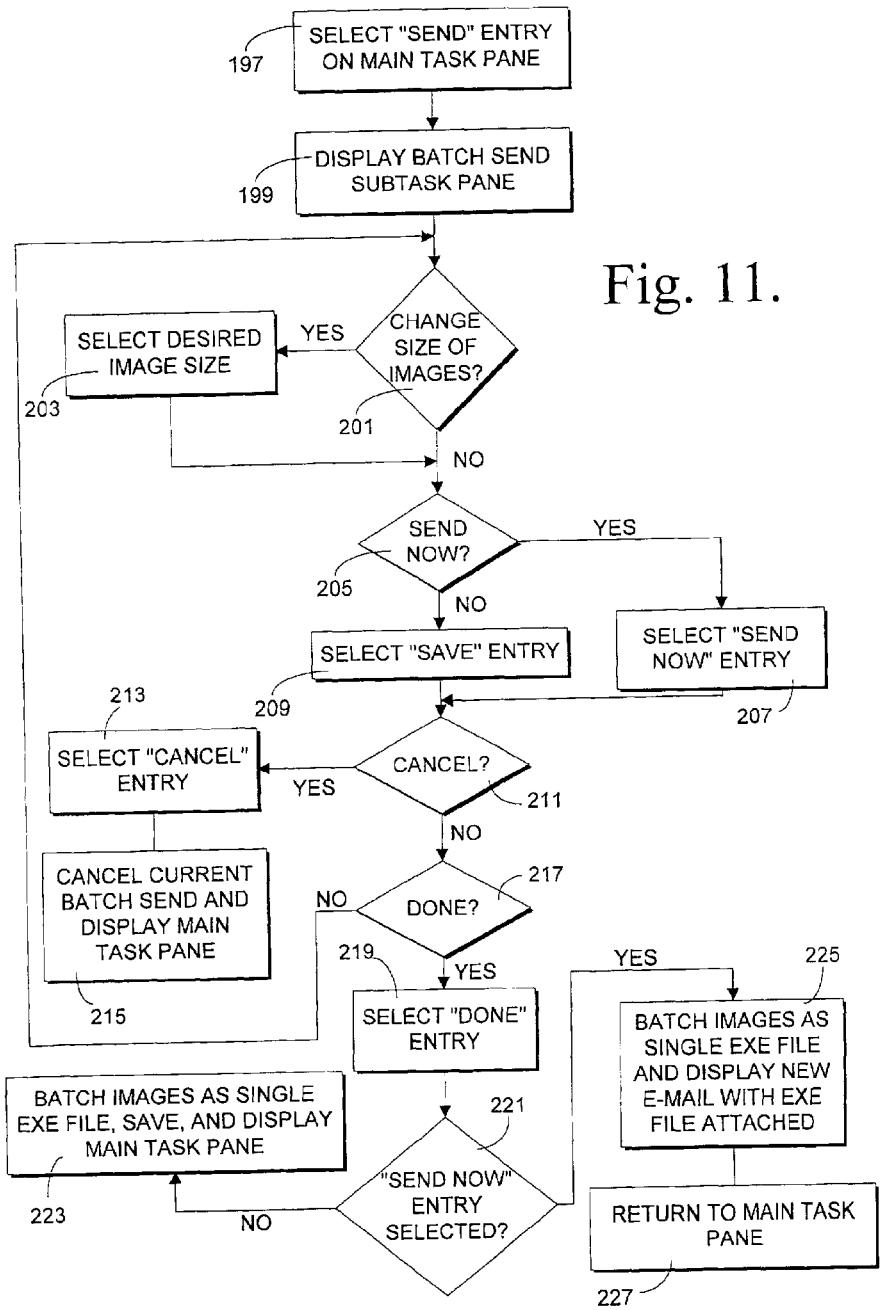
FIG. 11 is a flowchart illustrating the steps employed to send the group of images.

As shown in FIG. 11, when a user selects the "Send" entry on the main task pane at 197, the batch save sub-task pane is displayed at 199, and the user can decide at 201 whether to change the size of the images for sending. If a change is desired, the user selects the desired size at 203. If not, the operation proceeds to step 205 where the user must decide whether to send the images immediately or save the single file containing the images for sending later. If the images are to be sent immediately, the "Send Now" entry of the sub-task pane is selected at 207. If not, the "Save" entry is selected. Thereafter, at step 211, or at any stage of the operation, if the user wants to cancel the operation, the "Cancel" entry is selected at 213 and the current batch send operation is canceled and the user is returned to the main task pane at 215.

If, rather than canceling the send operation the user decides at 217 that the operation is to be completed, he or she selects the "Done" entry at 219. If the "Send Now" radio button is currently selected at this step, then the images are batched at 225 as a single executable file and displayed at an attachment within an e-mail application available to the operating system. Thereafter, the user is returned to the main task pane at 227. If the "Save" radio button of the sub-task pane is currently selected, then at 223 the images are batched and saved as a single executable file to be sent later, and the user is returned to the main task pane.

Figure 12:
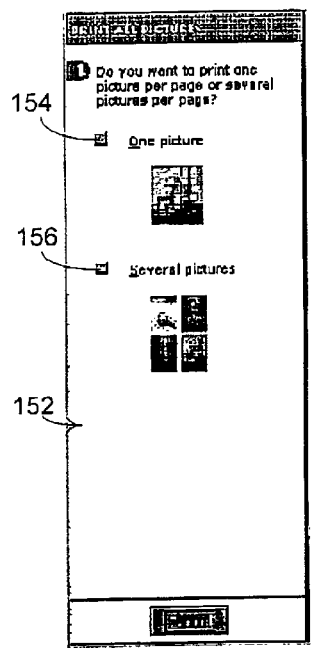
FIG. 12 is a view of a first batch print sub-task pane displayed during use of the system.
Figure 13:
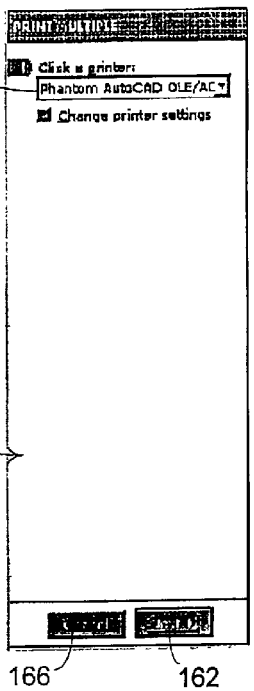
FIG. 13 is a view of a second batch print sub-task pane displayed during use of the system.

Referring again to FIG. 2, if the user selects the "Print" entry 96 of the main task pane 78 after selecting a group of the open images displayed in the picture pane, the batch print operation is executed on the selected images. The operation includes displaying a first sub-task pane 152, shown in FIG. 12, in place of the main task pane while all of the selected images remain displayed in the picture pane. The sub-task pane 152 includes two entries 154, 156, one 154 of which has an execution command for initiating printing of the images in a conventional fashion with one image printed per page, and the other 156 of which advances the user to a sub-task pane 158, shown in FIG. 13, that enables the user to print several of the selected images per page in any of a number of different formats.

The sub-task pane 158 is a printer select sub-task pane including a drop down list box 160 which enables the user to select the type of printer on which the images are to be printed. Once the user is satisfied with the correct printer has been selected, he or she selects a "Next" entry 162 which includes an execution command for retrieving and displaying the next sub-task pane in the batch print operation. Alternately, the user can cancel the batch print operation by selecting a "Cancel" entry 166, taking the user back to the main task pane.

Figure 14:
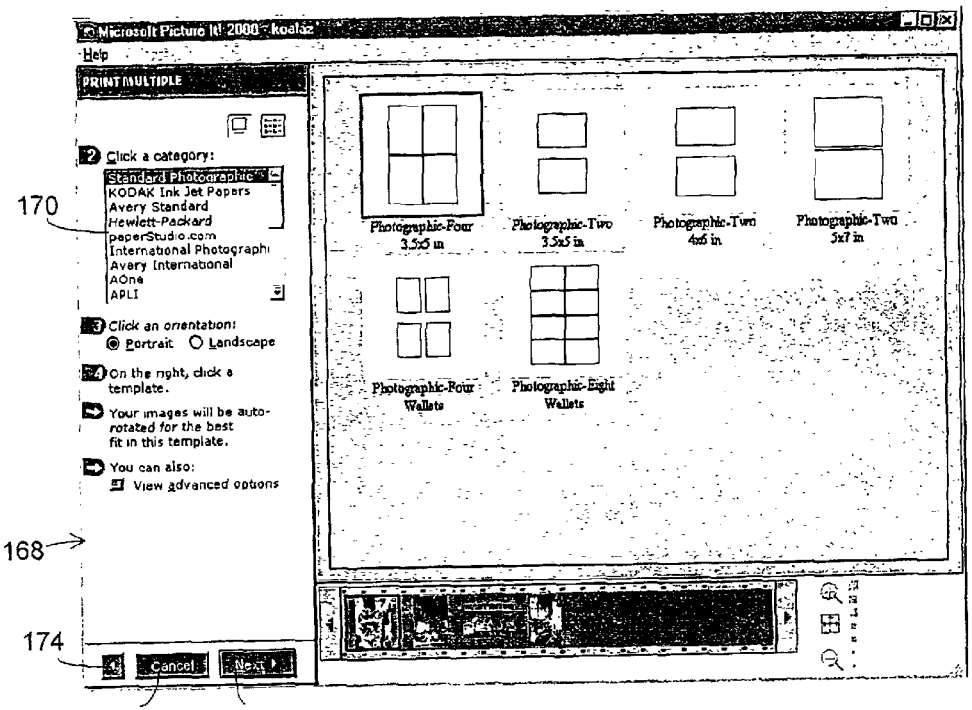
FIG. 14 is a view of a third batch print sub-task pane displayed during use of the system.

If several images are to be printed per page, and a printer has been selected, the operation displays a template sub-task pane 168, as shown in FIG. 14, which includes an entry 170 for enabling the user to select a category of templates into which the images are organized for printing, and other options. Preferably, during display of this sub-task pane, images of the templates in the highlighted category are displayed in the picture pane in place of the images to be printed, enabling the user to select the particular template desired. The desired template is preferably selected by moving the pointing device to the template and clicking a button of the device. Once the template is selected and any other options are chosen, the user indicates that the template selection is complete by selecting a "Next" entry 172 which includes an execution command for displaying an insert method sub-task pane in the batch print operation. If the user wants to go back to the previous sub-task pane, he or she selects a "◁" entry 174 which has a command for canceling the current template selection and displaying the previous sub-task pane. In addition, a "Cancel" entry 176 is provided for canceling the current batch print operation completely and returning to the main task pain.

Figures 15, 16:
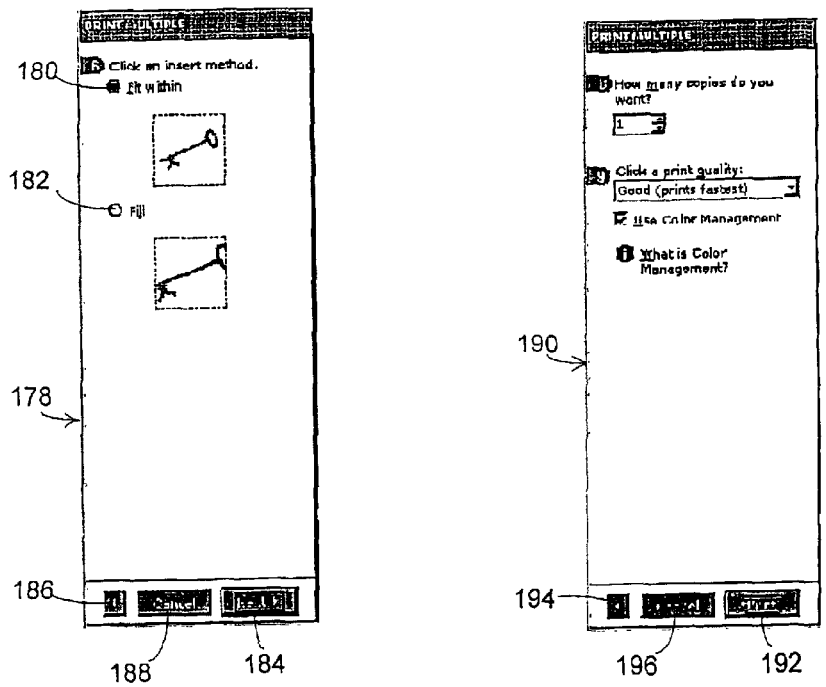
FIG. 15 is a view of a fourth batch print sub-task pane displayed during use of the system.
FIG. 16 is a view of a fifth batch print sub-task pane displayed during use of the system.

The insert method sub-task pane 178 is illustrated in FIG. 15, and includes a pair of radio buttons 180, 182 for permitting the user to either fit the images of the group within the template without cropping the images, or crop the images to fill the template. As with the previous batch print sub-task panes, entries 184, 186 are provided for indicating that the sub-task is complete or that the user wants to return to the previous sub-task pane within the batch print operation. In addition, a "Cancel" entry 188 is provided for canceling the current batch print operation and returning to the main task pane.

If the "Next" entry 184 of the insert method sub-task is selected, the operation proceeds by displaying one or more additional sub-task panes 190, shown in FIG. 16, including entries having execution commands for selecting the number of copies to be printed, the quality of the prints, and other options. The number and type of such options can be selected to suit the application. The final sub-task pane 190 displayed during the operation includes a "Print" entry 192 for executing printing of the images in the templates selected. Likewise, an entry 194 is provided for returning to the previously displayed sub-task pane of the operation. A "Cancel" entry 196 can also be provided for canceling the current batch print operation completely and returning to the main task pane.

Figure 17A:
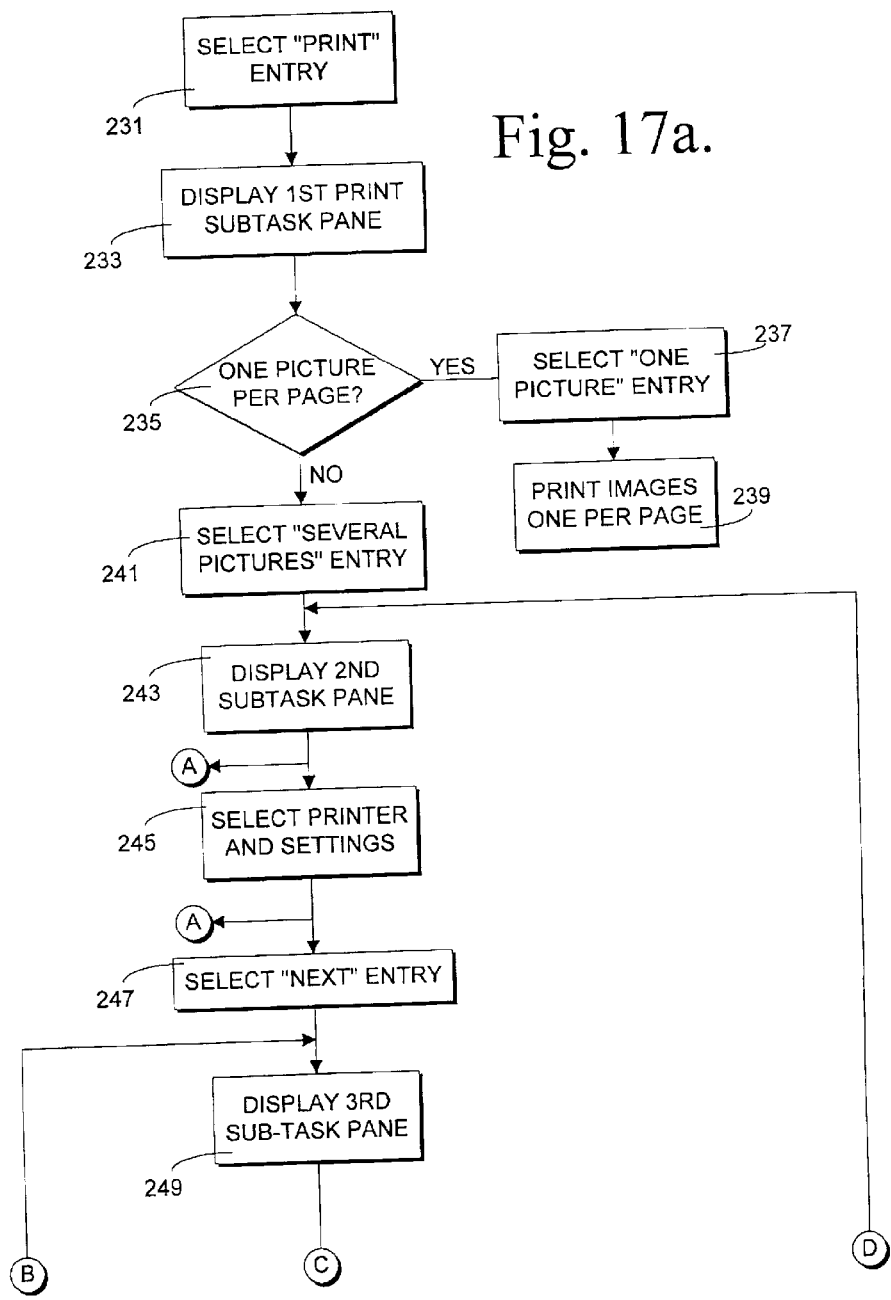
FIGS. 17a, 17b and 17c together provide a flowchart illustrating the steps employed to print the group of images.

With reference to the flow chart of FIG. 17*a*, the operation is initiated at 231 with the selection of the "Print" entry of the main task pane. This selection executes display of the first sub-task pane at 233, providing the user with the option to print one image per page or multiple images at 235. If one image per page is selected at 237, the images are printed in that fashion at 239 and the user is returned to the main task pane. If multiple pages are selected at 241, then the second sub-task pane is displayed at 243. The user can cancel the operation at 291, as illustrated in FIG. 17*c*, by selecting the "Cancel" entry on the pane, canceling the batch print and returning the user to the main task pane at 293. Alternately, the user can select the printer settings at 245 and move on by selecting the "Next" entry at 247.

Figure 17B:
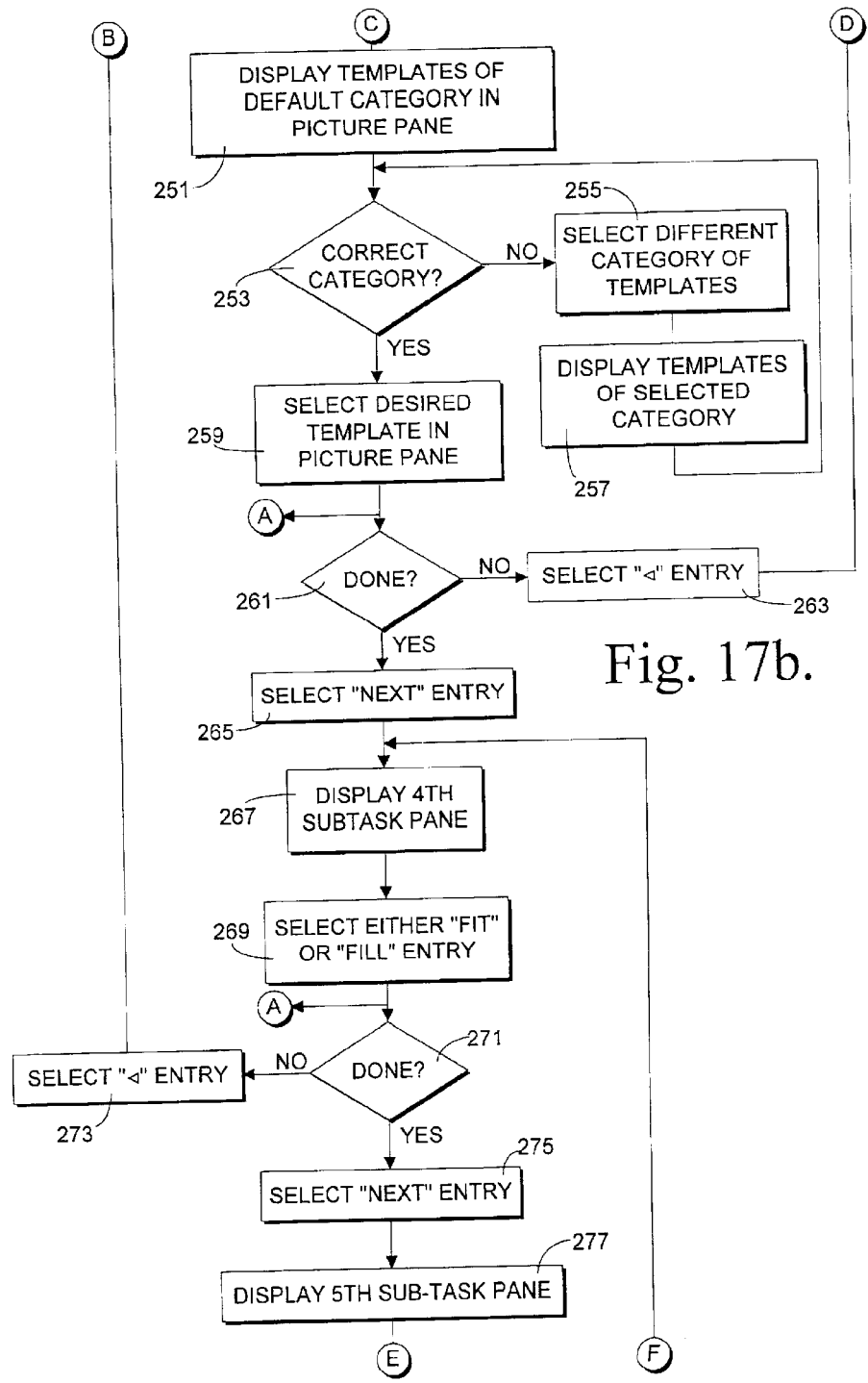
Figure 17C:
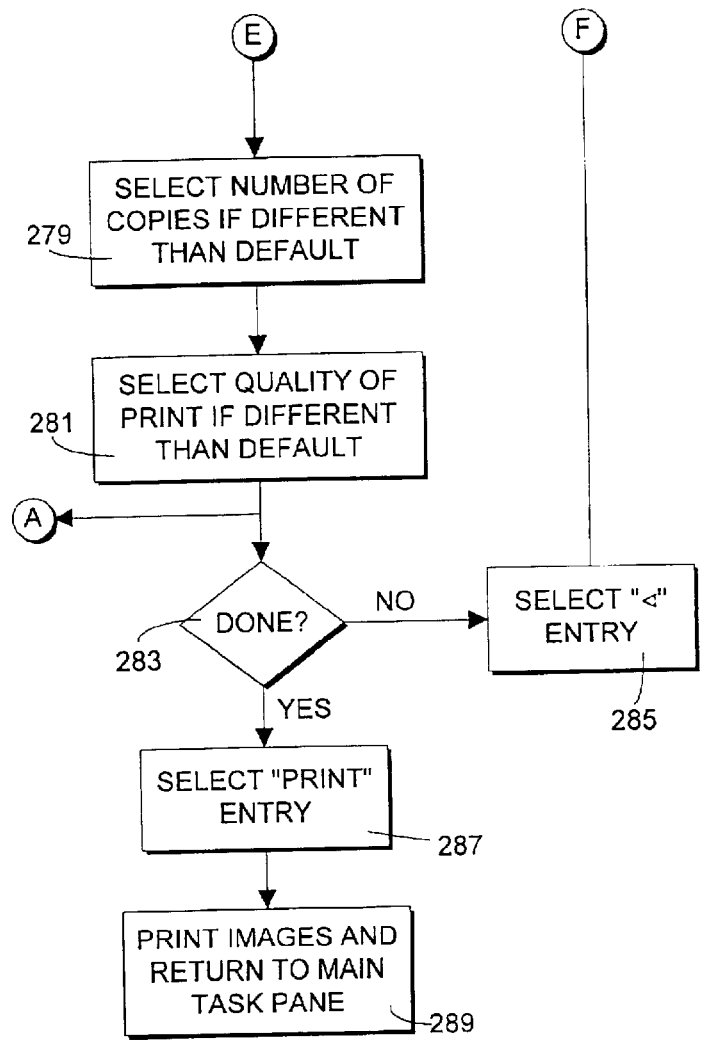
Figure 17C:
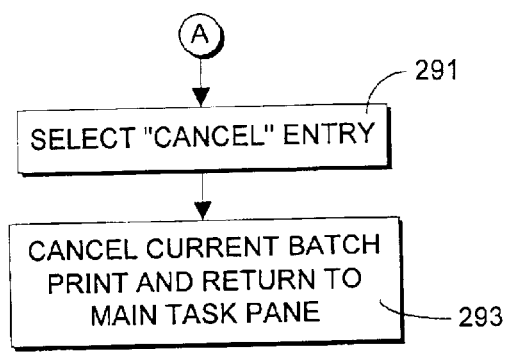

With reference to FIGS. 17*a* and 17*b*, the third sub-task pane is displayed in response to selection of the "Next" entry at 247, and at step 251 displays the templates of a preselected or default category of templates identified in the sub-task pane. If the user wants to view the templates of a different category at 253, he or she selects another category at 255, and the templates of that category are displayed at 257. Once the user is done selecting a template category at 261, they can either return to the previous sub-task pane by selecting the "◁" entry at 263 or proceed by selecting the "Next" entry at 265.

Selection of the Next" entry at 265 executes display of the fourth sub-task pane at 267, where the user can either select the "Fit" or "Fill" radio button at 269. If desired, at step 271 the user can return to the previous sub-task pane by selecting the "◁" entry at 273. Otherwise, the user selects the "Next" entry at 275, executing the display of the fifth sub-task pane at 277.

In the fifth sub-task pane, at step 279, the user selects the number of copies of the batch of images to be printed. In step 281, the user selects the desired quality. Again, if desired, the user can cancel the operation at 291 or return to the previous sub-task pane at 285 by selecting the "◁" entry. Otherwise, if done at step 283, the user selects the "Print" entry at 287 and the images are printed at 289, automatically rotating the images to fit the aspect ratio of the template holes into which the images are dropped, and returning the user to the main task pane.

If, subsequent to initiation of the system, the user selects only one of the open images displayed in the picture pane, the editing operations carried out on the one picture can either be carried out by using the various sub-task panes described above, or by employing panes from the photo editing software application with which the system is implemented. However, the use of conventional editing techniques on a single selected image do not take advantage of the features of the present invention.

Although the present invention has been described with reference to a preferred embodiment illustrated in the attached drawing, it is noted that substitutions may be made and equivalents employed herein without departing from the scope of the invention as recited in the claims. For example, although the invention has been described with reference to several specific editing operations that can be carried out in accordance with the present invention, the invention is not limited to just these operations. Rather, it can be employed with any desired editing operation that a user might want to carry out on plural digitally represented images.

What is claimed is:

1. In a computer system having a graphical user interface including a display and a user interface selection device, a method of selecting and revising a plurality of digitally represented still images, wherein each still image is a separate data file, the method comprising the steps of:

opening the data files of the plurality of still images;

displaying the plurality of still images in a filmstrip pane;

in response to a menu selection, displaying a task pane including at least one revision task entry having a specified multiple-image revision task command and displaying all of the plurality of still images in a picture pane simultaneously with the filmstrip pane and the task pane;

receiving a group-select execution signal indicative of the user selecting at least two of the still images displayed in the filmstrip pane and the picture pane for revision as a group;

in response to the group-select signal, forming a group of the selected still images and identifying the selected group by attaching an identifier to each selected image in the picture pane;

receiving a task execution signal indicative of the user selecting the multiple-image revision task entry;

in response to the execution signal, displaying a sub-task pane to allow user customization of revisions for each image in the group in accordance with a selected multiple-image revision task type for the group of selected still images;

altering the picture pane to display only one image from the group of selected images in the picture pane while the filmstrip pane simultaneously displays each opened still image; and providing navigation controls within the sub-task pane to allow the user to view each image from the group of selected images individually in the picture pane and allowing customized user revision of each successive image displayed in the picture pane using options provided on the sub-task pane without requiring repeated display of the task pane for any image in the group.

2. A method as recited in claim 1, wherein the task pane includes a "select all" entry having a selection command for selecting all of the open images for revision as a group, the group-select execution signal being indicative of the user selecting the "select all" entry.

3. A method as recited in claim 1, further comprising receiving a sub-task execution signal indicative of the user selecting the at least one option entry, and in response to the execution signal, performing the revision sub-task command on the selected image displayed in the picture pane.

4. A method as recited in claim 1, wherein the group-select execution signal is indicative of a user sequentially selecting at least two of the open still images while simultaneously selecting a control key.

5. A computer readable medium having computer-executable instructions for performing a method for selecting and revising a plurality of digitally represented still images, wherein each still image is a separate data file, comprising:

opening the data files of the plurality of still images;

displaying the plurality of still images in a filmstrip pane;

in response to a menu selection, displaying a task pane including at least one revision task entry having a specified multiple-image revision task command and displaying all of the plurality of still images in a picture pane simultaneously with the filmstrip pane and the task pane;

receiving a group-select execution signal indicative of the user selecting at least two of the still images displayed in the filmstrip pane and the picture pane for revision as a group;

in response to the group select signal, forming a group of the selected still images and identifying the selected group by attaching an identifier to each selected image in the picture pane;

receiving a task execution signal indicative of the user selecting a multiple-image revision task entry from the task pane;

in response to the execution signal, displaying a sub-task pane to allow user customization of revisions in accordance with a selected revision task type for each image in the group of selected still images;

altering the picture pane to display only one image from the group of selected images in the picture pane while the filmstrip pane simultaneously displays each opened still image; and providing navigation controls within the sub-task pane to allow the user to view each image from the group of selected images individually in the picture pane and allowing customized user revision of each successive image displayed in the picture pane using options provided on the sub-task pane without requiring repeated display of the task pane for any image in the group.

6. The computer readable medium of claim 5, wherein the task pane includes a "select all" entry having a selection command for selecting all of the open images for revision as a group, the group-select execution signal being indicative of the user selecting the "select all" entry.

7. The computer readable medium of claim 5, further comprising receiving a sub-task execution signal indicative of the user selecting the at least one option entry, and in response to the execution signal, performing the revision sub-task command on the selected image displayed in the picture pane.

8. The computer readable medium of claim 5, wherein the group-select execution signal is indicative of a user sequentially selecting at least two of the open still images while simultaneously selecting a control key.

* * * * *